United States Patent [19]

Mochizuki et al.

[11] 4,270,047

[45] May 26, 1981

[54] INFORMATION DETECTING APPARATUS

[75] Inventors: Noritaka Mochizuki; Yoshioki Hajimoto, both of Yokohama, Japan

[73] Assignee: Canon Kabushiki Kaisha, Tokyo, Japan

[21] Appl. No.: 34,206

[22] Filed: Apr. 27, 1979

[30] Foreign Application Priority Data

Apr. 28, 1978 [JP] Japan .................................. 53-51837

[51] Int. Cl.³ .............................................. H01J 40/14
[52] U.S. Cl. .................................... 250/216; 250/578; 358/212
[58] Field of Search ...................... 250/578, 216, 566; 358/212, 213

[56] References Cited

U.S. PATENT DOCUMENTS 4,053,773  10/1977  Deresh et al. .................. 250/578 X
4,143,809   3/1979  Uebbing et al. ................ 250/566 X

*Primary Examiner*—David C. Nelms
*Assistant Examiner*—Darwin R. Hostetter
*Attorney, Agent, or Firm*—Fitzpatrick, Cella, Harper & Scinto

[57] ABSTRACT

An original reading apparatus for converting information such as pictures written on an original surface into electrical signals for reading is disclosed. The apparatus includes a photoelectric sensor having a plurality of photoelectric elements for detecting light coming from the original surface, an illuminating system for illuminating the original surface uniformly through the photoelectric sensor, an image forming optical system for forming an erect equal magnification image of the original surface on the surface of the photoelectric sensor and means for moving the apparatus relative to the original surface.

4 Claims, 10 Drawing Figures

INFORMATION DETECTING APPARATUS

BACKGROUND OF THE INVENTION

1. Field of the Invention

The present invention relates to a reader, that is, apparatus which converts information of an original surface or a surface to be examined into electrical signals and reads out the same. The apparatus to which the present invention pertains is usable together with image information processing apparatus such as facsimile, laser beam printer, ink jet printer or the like and also may be utilized together with such apparatus used for inspecting a flaw or flaws on the surface of an object.

For the purpose of this specification, the term "original surface" should be understood to include also such surface which is to be examined or whose flaw is to be inspected.

2. Description of the Prior Art

There are various types of apparatus which optically read information of an original surface and in which a photoelectric sensor is used as light detector. However, in the past, it was very difficult to obtain photoelectric sensor of high resolving power satisfactorily useful in the information reading apparatus. There was available only such solid photographing element of several centimeters in length an example of which is that called Charge Coupled Device (CCD). For that reason, in order to read information on an original surface it was required to use a reducing optical system with an optical axis in the apparatus and carry out reading of the information by forming a reduced image of the original surface on such solid photographing element.

However, such known apparatus in which a reduced image of an original surface is formed on a solid photographing element of high resolving power by the use of a reducing optical system with an optical axis had various disadvantages. One of the disadvantages was a long conjugate distance required for reducing image formation between the original surface and the solid photographing element. Because of the long conjugate distance, the apparatus had to have a larger size as a whole. Secondly, the finite opening of the reducing optical system has resulted in a decreased quantity of the image plane light on the solid photographing element surface, which has, in turn, led to a reduced sensitivity. In addition, since the quantity of image plane light decreased gradually as it departed from the optical axis, it was impossible to maintain the sensitivity at a constant level.

With the recent advancement of the technique in the art there have been developed those photoelectric sensors of high resolving power which allow a very long structure while each sensor element constituting the minimum unit capable of separating and reading information light in the structure are very small. As an example, mention may be made of a thin film photo diode array formed by Se-As-Te noncrystalline semiconductors. Thus, it has become possible to realize a novel form of apparatus which uses these photoelectric sensors instead of the reducing optical system to read information on an original surface. This novel type of information reading apparatus can be designed very compactly as disclosed, for example, in Japanese Laid Open Patent Application No. 104808/1977.

SUMMARY OF THE INVENTION

It is an object of the present invention to provide an information detecting apparatus which is compact in structure and which is high in resolution.

It is another object of the invention to provide an information detecting apparatus which enables reduction of the distance between the original surface and the photoelectric sensor and therefore enables design of the apparatus compactly without losing the feature of high resolution.

It is a further object of the invention to provide an information detecting apparatus which necessitates no particular space provided between the original surface and the photoelectric sensor surface to receive the light for illuminating the original surface and therefore allows a compact structure while maintaining the feature of high resolution.

According to an aspect of the invention to attain the above objects there is disposed an image forming optical system for forming an erect equal magnification image of the original surface between the photoelectric sensor and the original surface. The original surface and the photoelectric sensor surface are disposed conjugate to each other relative to the optical system. With the arrangement of the information detecting apparatus in accordance with the invention, the image of an original surface is always formed on the photoelectric sensor as an erect equal magnification image. In a preferred embodiment of the invention, the image forming optical system is composed of an ommateal optical system to maintain a 1:1 image formation relation between the original surface and the photoelectric sensor surface.

Since the resolving power of the above mentioned type of information detecting apparatus varies depending upon the size of each element in the photoelectric sensor, the smaller the element is, the higher resolving power the apparatus has. The photoelectric sensor used in the invention is composed of a plurality of elements each being very small in size and therefore it has a very high resolving power. Furthermore, by the use of an erect equal magnification image forming optical system there is always maintained a relation of 1:1 between the sensor surface and the original surface. This prevents a beam of light coming from one point on the original from entering two or more elements of the sensor so that an improvement in S/N ratio may be achieved.

The use of and ommateal optical system enables formation of the erect equal magnification image forming optical system by an optical system whose focal length is relatively short. This makes it easy to reduce the size of the information detecting apparatus as a whole.

According to another aspect of the invention, an original illuminating light source unit is provided not at the same side as the original surface but at the side opposite to the original surface relative to the photoelectric sensor and the erect equal magnification image forming optical system. This has a particular effect on the compactness of the apparatus. With this arrangement, the illumination light beam passes through the photoelectric sensor and illuminates the original surface through the image forming optical system. Therefore, the image forming optical system can perform two functions at the same time, namely to concentrate the original illuminating light and also to receive the beam of light coming from the original surface.

Other and further objects, features and advantages of the invention will appear more fully from the following description taken in connection with the accompanying drawings.

DESCRIPTION OF THE PREFERRED EMBODIMENTS

Figure 1:
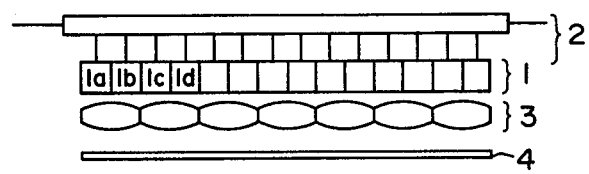
FIG. 1 is a schematic illustration of information detecting apparatus to which the present invention pertains.

Referring first to FIG. 1 showing the positional relation between the erect equal magnification image forming optical system and the photoelectric sensor in information detecting apparatus in accordance with the invention, the reference numeral 1 designates a photoelectric sensor composed of a plurality of sensor elements $1a, 1b, 1c \ldots$. The size of one sensor element determines the minimum size of the picture element resolvable for reading. Designated by 2 is a shift register which takes up information signals from every element of the sensor 1 in a fashion of time series in the direction of reading. 3 is an erect equal magnification image forming optical system composed of an ommateal lens system which forms on the surface of the photoelectric sensor 1 an erect equal magnification image of an original surface 4.

Figure 2:
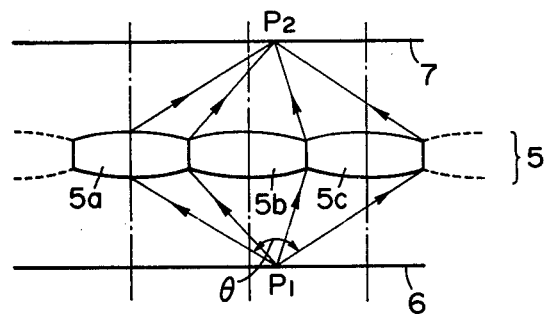
FIG. 2 is an explanatory view of an erect equal magnification image forming optical system used in the invention.

In FIG. 2, there is shown an erect equal magnification lens system 5 as an example of the erect equal magnification image forming optical system 3. The lens system generally designated by 5 is composed of a plurality of lens elements $5a, 5b, 5c \ldots$, these lens elements being all the same. Relative to the lens element, the two surfaces 6 and 7 are optically conjugated. The relation of surface 7 to surface 6 corresponds to the relation of the sensor surface to the original surface in the apparatus shown in FIG. 1. For an erect equal magnification image forming optical system, the surfaces 6 and 7 correspond to front and rear principle planes respectively. This means that the surface 6 in FIG. 2 corresponds to one principle plane of each the lens element ($5a, 5b, 5c, \ldots$) and the surface 7 corresponds to another principle plane. Therefore, rays of light diverged from a point $P_1$ on the surface 6 are always imaged on the point $P_2$ on the surface 7 corresponding to $P_1$ on the surface 6 although the rays may pass through different elements $5a, 5b, 5c$ and so on. In this case, the image formed is an erect image of equal magnification and therefore an orthogonal projection image of the surface 6 is formed on the surface 7. Let the surface 7 be the surface of the photoelectric sensor and the surface 6 be the original surface, then it will be understood that the image formed on the sensor surface exactly corresponds to the original surface.

Since, as previously noted, the level of resolving power of the information detecting apparatus depends upon the size of each sensor element, a higher resolving power can be obtained by using a smaller element according to the principle of the present invention. In this sense, the combination of an erect equal magnification image forming optical system and a photoelectric sensor is very advantageous over the prior art. Furthermore, it brings forth an advantage of improved S/N ratio. Since the beam of light diverged from one point on the original always forms its image at one point on the sensor surface after passing through different elements of the ommateal optical system, it is allowed to receive the scattered light from the original surface at a wide angle $\theta$.

Figure 3:
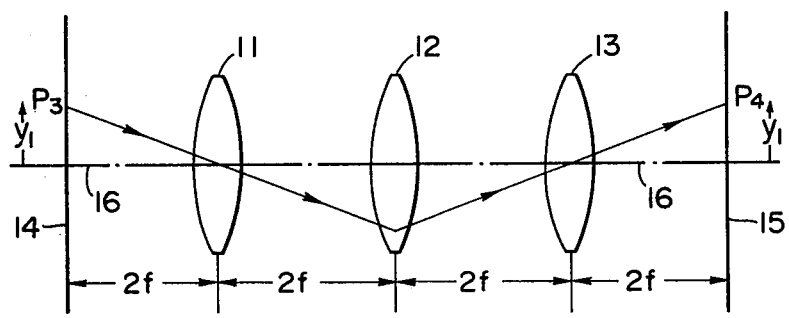
FIGS. 3, 4 and 5 shows various embodiments of the image forming optical system respectively.
Figure 4:
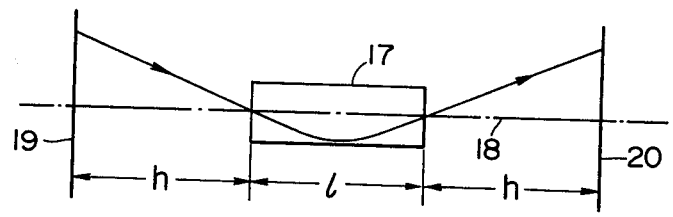
Figure 5:
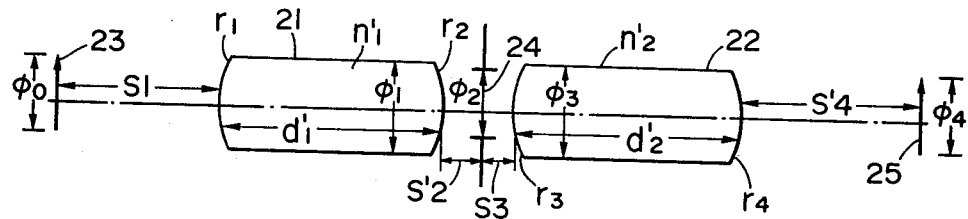

Some embodiments of the erect equal magnification image forming optical system are shown in FIGS. 3, 4 and 5.

The image forming optical system shown in FIG. 3 is composed of three positive single lenses 11, 12 and 13. The lenses 11 and 13 have the same focal length of f and the lens 12 functions as a field lens. These three lenses 11, 12 and 13 are spaced from each other with a distance of 2f. The front principle plane 14 of the lens system lies in the position of 2f at the object side of the lens 11 and the rear principle plane 15 in the position of 2f at the image side of the lens 13. With this arrangement of the optical system, a beam of light emitted from a point $P_3$ on the front principle plane being remote from the optical axis 13 by $y_1$ is imaged at first at a position near the field lens 12 and then reimaged by the lens 13 on the rear principle plane 15 at a point $P_4$ being remote from the optical axis 16 by $y_1$. Therefore, let an original surface place be on the front principle plane 14 and a photoelectric sensor be on the rear principle plane 15, then an erect equal magnification image of the original surface will be formed on the sensor. By arranging a plurality of such lens systems in the direction of reading there is formed an ommateal optical system which can be used in the information detecting apparatus in accordance with the invention.

In the embodiment shown in FIG. 4, there is used a lens element 17 whose refractive index is gradually increased from the optical axis to the marginal at a rate in proportion to the square of the distance from the optical axis. Since the lens element has such a particular characteristic of refractive index distribution, it is useful for forming an erect equal magnification image. For this purpose, a surface 19 is positioned at a position spaced from one end surface $17a$ of the lens element by a distance of h and another surface 20 is positioned at a position spaced from another end surface $17b$ by the same distance h. Here, to establish the desired optically conjugated image forming relation of erect equal magnification between the two surfaces 19 and 20, the distance h should be selected to satisfy the following relation:

$$h = \frac{1}{n_o \sqrt{a}} \cdot \tan \frac{\sqrt{a}}{2} l$$

wherein, $n_o$ is refractive index on the optical axis, a is a constant of refractive index gradient, and l is length of the lens element.

By arranging a plurality of such lens elements in a form of array extending in the direction of reading there is formed an erect equal magnification image forming optical system which can be used in the information detecting apparatus in accordance with the invention.

FIG. 5 shows another form of erect equal magnification image forming optical system used in the information detecting apparatus in accordance with the invention. The optical system is composed of two groups of rod-like lenses arranged in a form of array, of which only two lenses are shown in FIG. 5. The first lens 21 and second lens 22 are arranged coaxially. The first lens forms an intermediate image 24 of an object 23 at a position between the first and second lenses 21 and 22. The second lens 22 forms again an image 25 of the intermediate image 24 on a projection surface.

The first lens 21 and second lens 22 are designed to satisfy the following relations:

$$K_1 \times (n_1' - 1) \times \frac{\beta_1 S_1}{\left((1 - \beta_1) - \frac{S_2}{\beta_1 S_1}\right)} \leq r_1 \leq K_2 \times$$

$$(n_1' - 1) \times \frac{\beta_1 S_1}{\left((1 - \beta_1) - \frac{S_2'}{\beta_1 S_1}\right)},$$

$$K_1 \times (1 - n_1') \times \beta_1 S_1 \geq r_2 \geq K_2 \times (1 - n_1') \times \beta_1 S_1,$$

$$K_1 \times n_1' \times \beta_1 S_1 \leq d_1' \leq K_2 \times n_1' \times \beta_1 S_1,$$

$$K_1 \times \frac{-S_1/Fe}{1 - (\frac{1}{2Fe})^2} \leq \phi_1 \leq K_2 \times \frac{-S_1/Fe}{1 - (\frac{1}{2Fe})^2},$$

$$K_1 \times \left(\frac{(\frac{S_2'}{\beta_1}) - S_1}{\beta_1 S_1}\right) \times \phi_1 \leq \phi_2 \leq K_2 \times$$

$$\left(\frac{(\frac{S_2'}{\beta_1}) - S_1}{\beta_1 S_1}\right) \times \phi_1,$$

$$(1 - n_2') \times \frac{S_4'}{\beta_2} \times K_1 \leq r_3 \leq K_2 \times (1 - n_2') \times \frac{S_4'}{\beta_2},$$

$$K_1 \times (n_2' - 1) \times \frac{S_4'/\beta_2}{\left((1 - \frac{1}{\beta_2}) - \frac{B_3 \times \beta_2}{S_4'}\right)} \geq r_4 \geq K_2 \times$$

$$(n_2' - 1) \times \frac{S_4'/\beta_2}{\left((1 - \frac{1}{\beta_2}) - \frac{S_3 \times \beta_2}{S_4'}\right)} - n_2' \times S_4'/\beta_2 \times$$

$$K_1 \leq d_2' \leq K_2 \times (-n_2') \times S_4'/\beta_2,$$

$$\frac{S_4'/Fe'}{\sqrt{1 - (\frac{1}{2Fe'})^2}} \times K_1 \leq \phi_3 \leq \frac{S_4'/Fe'}{\sqrt{1 - (\frac{1}{2Fe'})^2}} \times K_2,$$

$$\left(\frac{S_3\beta_2 - S_4'}{S_4'/\beta_2}\right) \times \phi_3 \times K_1 \leq \phi_4 \leq \left(\frac{S_3\beta_2 - S_4'}{S_4'/\beta_2}\right) \times \phi_3 \times K_2$$

wherein $r_1$ is radius of curvature of the object side surface of the first lens 21, $r_2$ is radius of curvature of the image side surface of the first lens, $d_1'$ is lens thickness between the object side surface and image side surface of the first lens measured on the optical axis, $\phi_1$ is effective diameter of the first lens, $\phi_0$ is size of the object 23, $\phi_2$ is size of the intermediate image 24, $n_1'$ is refractive index of the first lens to the design wavelength of medium, $\beta_1$ is lateral magnification of the first lens, $S_1$ is distance from the object side surface of the first lens to the object surface measured along the optical axis, $S_2'$ is distance from the image side surface of the intermediate image plane measured along the optical axis, Fe is effective F number at the object side, $K_1 = 0.9$, $K_2 = 1.1$, $r_3$ is radius of curvature of the object side surface of the second lens 22, $r_4$ is radius of curvature of the image side surface of the second lens, $d_2'$ is lens thickness between the object side surface and image side surface of the second lens on the optical axis, $\phi_3$ is effective diameter of the second lens, $\phi_4$ is size of the image projected on the projection surface by the second lens, $n_2'$ is refractive index of the second lens to the design wavelength of medium, $\beta_2$ is lateral magnification of the second lens, $S_3$ is distance from the object side surface to the intermediate image plane measured along the optical axis, $S_4'$ is distance from the image side surface to the projected image measured along the optical axis, and Fe' is effective F number of the second lens at the image side;

in which, $r_3 = -r_2$, $r_4 = -r_1$, $d_2' = d_1'$, $n_2' = n_1'$, $\phi_3 = \phi_1$, $\phi_4 = \phi_0$, $\beta_2 = 1/\beta_1$, $S_3 = -S_2'$, $S_4' = -S_1$, and $Fe' = Fe$.

Figure 6:
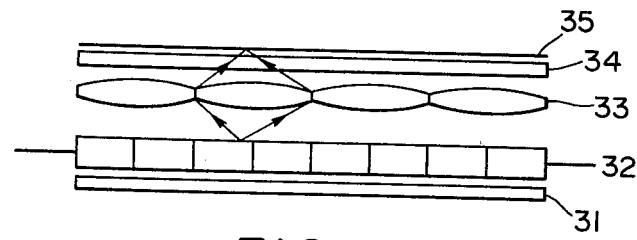
FIG. 6 shows an embodiment of image detecting apparatus in accordance with the invention.

FIG. 6 schematically shows an embodiment of information detecting apparatus in accordance with the invention.

In FIG. 6, the reference numeral 31 designates an illuminating light source and 32 is a photoelectric sensor provided with means for taking up signals as previously described with reference to FIG. 1. 33 is an erect equal magnification lens system of an ommateal optical system, 34 is a transparent original table and 35 is an original.

The illumination light illuminates the original surface 35 after passing through the photoelectric sensor 32 and lens system 33. Since the original surface 35 and the surface of the sensor 32 are disposed optically conjugated relative to the lens system 33, rays of light scattered by the original surface enter the sensor 32. When the light source is located sufficiently near the sensor, the illumination light is effectively condensed by the lens system 33 to illuminate the original surface.

Now, the composition of photoelectric sensor is described in detail with reference to FIG. 7.

Figure 7:
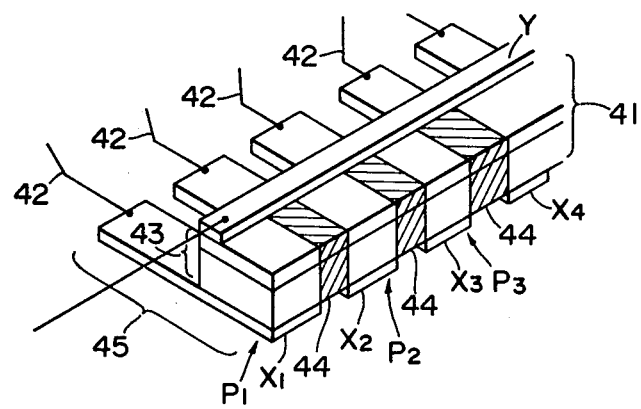
FIG. 7 is a perspective view of a photoelectric sensor used in the invention.
Figure 8:
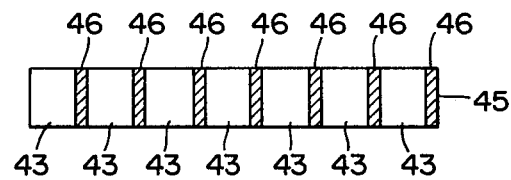
FIG. 8 schematically shows the arrangement of the photoelectric sensor used in an embodiment of the present invention.

In FIG. 7, a photoelectric sensor is designated generally by 45. The sensor 45 is composed of a plurality of sensor elements 41 ($P_1$, $P_2$, $P_3$ ... $P_n$) arranged on a light transmissive base plate such as a glass plate not shown. Each element 41 comprises an independent electrode 42 ($X_1$, $X_2$, $X_3$ ... $X_n$), a common electrode Y which is common to all the elements and a photo-electric conversion layer 43. The photo-electric conversion layer 43 is formed, for example, as a photo-electromotive force layer containing p-n junction. The common electrode Y needs not to cover all the surface of the photo-electric conversion layer 43, but covers only a portion of it as shown in FIG. 7. These layers 43 must be electrically isolated from each other by an electric insulator part 44.

The photo-electric conversion layer 43 may be a photoconductive layer. In this case, the insulator part 44 may be omitted.

As previously described in connection with the apparatus shown in FIG. 6, the illumination light emitted from the light source 31 has to reach the original surface passing through the photoelectric sensor 32. This may be attained by any of the following methods:

The first method is to have the illumination light transmitted through the photo-electric conversion layer 43 shown in FIG. 7. In this case, the independent electrodes and the common electrode must be transmissive to the illumination light. Also, in this case, the photo-electric conversion layer 43 must be designed in such manner that it does not absorp all or essentially all of the illumination light before the latter reaches the original surface but it allows for a sufficient quantity of the illumination light to reach the original surface. This may be attained by suitably selecting the thickness of the layer.

Let $I_0$ denote the quantity of light directly entering the photo-electric conversion layer from the illuminating light source, $I_1$ the quantity of light entering the layer after passing through the layer one time and then being scattered by the white portion of the original and $I_2$ the quantity of light entering the layer after passing through the layer and then being scattered by the black portion of the original, then there are obtained from the photoelectric sensor the following signals:

As for the white portion of the original: signal corresponding to $(I_0+I_1)$;

As for the black portion: signal corresponding to $(I_0+I_2)$.

Therefore, by setting a threshold level between $(I_0+I_1)$ and $(I_0+I_2)$ it is possible to read out information while discriminating the black signal from the white signal.

Discrimination between the black signal and white signal may be made also by providing a second photoelectric sensor. The second sensor has one surface facing the light source made non-transmissive to the illumination light to detect only the light scattered by the original. The signal obtained from the second sensor is compared with that from the first sensor to discriminate information of white portion from that of black portion of the original.

The second method is to have the illumination light transmitted through the insulator parts 44 shown in FIG. 7.

In this case, one surface of the photo-electric conversion layer 43, that is, the surface at the side of the light source is made non-transmissive to the illumination light so as to detect only such portion of light scattered by the original surface after passing through the insulator part 44. Although the light receiving surface of the sensor and the original surface have a conjugated relation of erect equal magnification relative to the lens system, a uniform illumination to the original surface can be assured by providing the insulator part 44 with light scattering property. The insulator part having light scattering property is able to scatter the illumination light coming into it so that the scattered light may enter the layer 43 through the side surface thereof to illuminate the light receiving surface of the sensor uniformly. Therefore, the original surface which has an erect equal magnification conjugate relation to the sensor surface can also be illuminated uniformly. Scattered light from the original surface passes again through the lens system and then enters the sensor in which the incident light is converted into electrical signal. The light scattering insulator part 44 may be formed, for example, by light scattering fiber glass.

Now, the structure of the sensor element is described in detail with reference to FIGS. 9 and 10.

Figure 9:
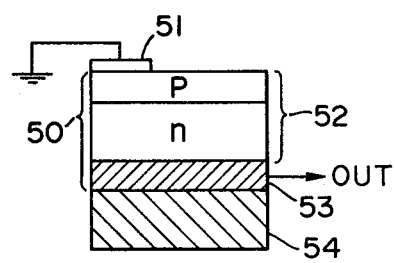
FIGS. 9 and 10 are explanatory illustrations of photoelectric conversion elements respectively.

The photoelectric sensor element shown in FIG. 9 is of the type of photo-electromotive force. This element 50 comprises a photo-electromotive force layer 52 sandwiched in between a common electrode 51 and an independent electrode 53.

In the shown embodiment, a p-type semiconductor layer is provided at the side of the common electrode 51 and a n-type semiconductor layer is provided at the side of the independent electrode 53 to form a so-called p-n junction. Of course, the order of p-n layers shown in FIG. 9 may be reversed. The p-n junction formed in the layer 52 may be home-junction or hetero-junction.

Both of the electrodes 51 and 53 are made from such material which can make an Ohmic contact with the layer 52.

When the illumination light is projected from the side of the common electrode 51 as in the case of FIG. 9, the p-type semiconductor layer preferably has a smaller thickness so that as much of the illumination light as possible may reach the part of p-n junction. On the contrary, when the illumination light is projected from the side of the substrate 54, it is preferable to give the n-type layer a smaller thickness.

Figure 10:
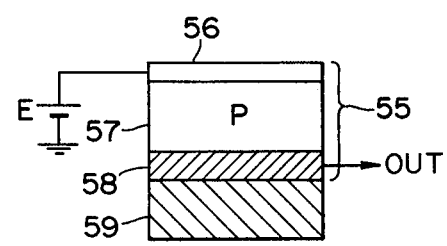

The sensor element 55 shown in FIG. 10 is of the photoconductive type. The element 55 comprises an independent electrode 58 provided on a substrate 59, a photo-electric conversion layer 57 of photoconductive material and a common electrode 56. Any known photoconductive material may be used to form the photoelectric conversion layer 57. The electrodes 56 and 57 are made from such material which can make an Ohmic contact with the layer 57. The layer 57 may be of p-type, n-type or of p-n laminate.

When the illumination light is projected onto the original surface 35 through the photo-electric conversion layer of the sensor in the information detecting apparatus shown in FIG. 6, the central part of the original 35 is illuminated in a higher degree as in the marginal portion of the original. Therefore, in order to illuminate the original surface uniformly it is necessary to provide masking means between the original 35 and the light source 31. For example, the desired uniform illumination may be attained in the following manner:

The photoelectric sensor is placed with its substrate facing the illuminating light source 31. A glass layer constituting the substrate is so shaped as to have a larger thickness at the central portion than that at the edge portion. In this manner, the quantity of light is reduced at the center part so that the original surface may be illuminated uniformly.

If the surface of the lens system 33 facing the original is formed by a plane, then the transparent original table 34 is dispensable. In this case, the one surface of the erect equal magnification lens system 33 can serve also as an original table.

In the above embodiments, the information detecting apparatus according to the invention has been shown and described as that of one-dimensional structure. However, the principle of the present invention is also applicable for two-dimensional reading of an original. For this purpose, the photoelectric sensor is arranged two-dimensionally and the signals coming from the sensor are read out in a manner of two-dimensional scanning.

While the invention has been particularly shown and described with reference to preferred embodiments thereof, it will be understood by those skilled in the art that the foregoing and other changes in form and details can be made therein without departing from the spirit and scope of the invention.

What we claim is:

1. Information detecting apparatus comprising:
   a photoelectric sensor including a plurality of sensor elements;
   an image forming optical system for forming an image of an original surface on the surface of said photoelectric sensor;
   a light source unit for illuminating the original surface through said photoelectric sensor and said image forming optical system;
   means for reading the signals provided on each photoelectric conversion surface in a fashion of time series; and
   driving means for producing a relative movement between said photoelectric sensor and said original.

2. Information detecting apparatus according to claim 1, wherein said image forming optical system is such one which forms an erect equal magnification image of the original surface on the surface of said photoelectric sensor.

3. Information detecting apparatus according to claim 2, wherein said image forming optical system is ommateal.

4. Information detecting apparatus comprising:
   an illuminating light source unit;
   a photoelectric sensor consisting of a plurality of sensor elements;
   an ommateal image forming optical system for forming an erect equal magnification image of an original surface on the surface of said photoelectric sensor;
   means for reading the signals provided on each photoelectric conversion surface in a fashion of time series; and
   driving means for producing a relative movement between said photoelectric sensor and said original, and wherein light emitted from said illuminating light source unit passes through said photoelectric sensor and said ommateal image forming optical system and then uniformly illuminates said original surface and wherein light reflected or scattered by said original surface again passes through said optical system so as to form an erect equal magnification image of said original surface on the surface of said photoelectric sensor, said erect equal magnification image being detected by said photoelectric sensor.

* * * * *